Figure 5:
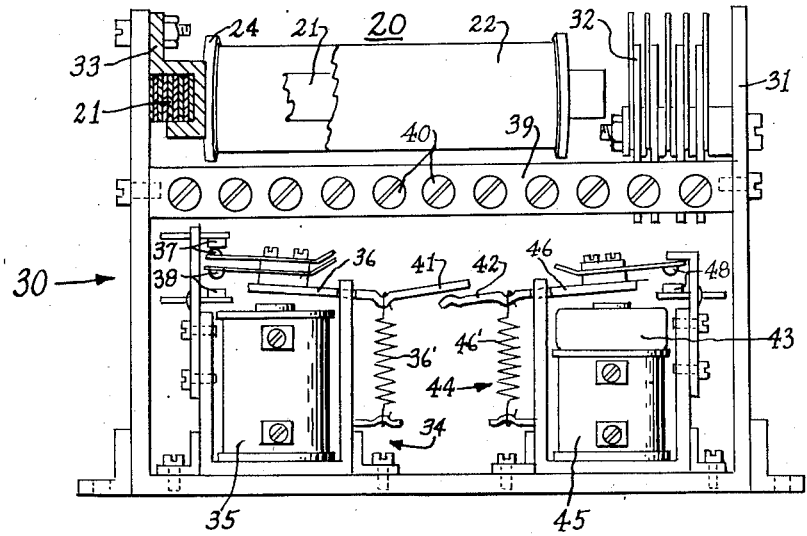

Dec. 31, 1957 W. E. McFARLAND 2,818,512
DUAL LOAD RELAY AUTOMATIC STARTING SYSTEM FOR
ENGINE-GENERATOR PLANTS
Filed Feb. 1, 1956 3 Sheets-Sheet 1
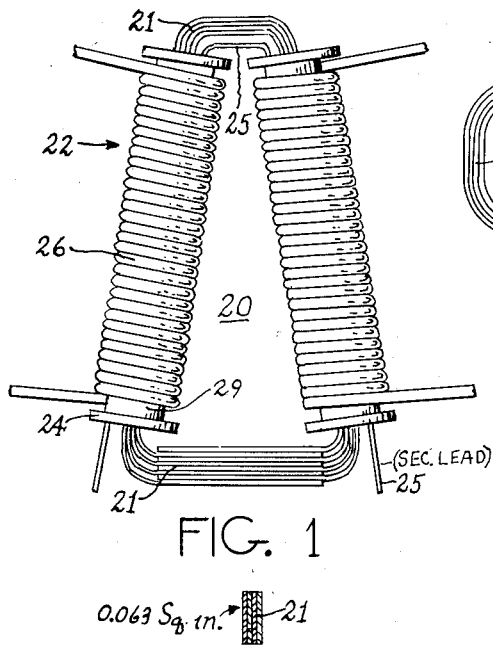
FIG. 1
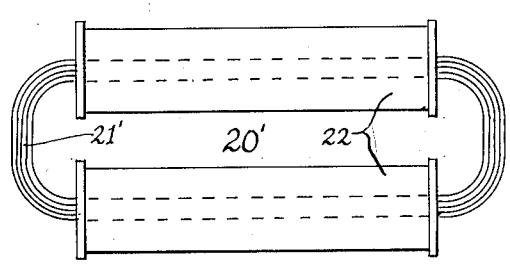
FIG. 4
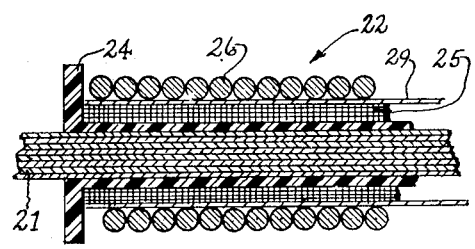
FIG. 3
FIG. 2
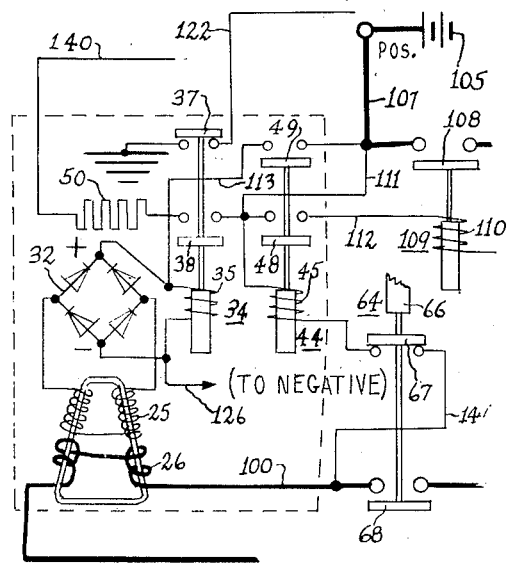
FIG. 10
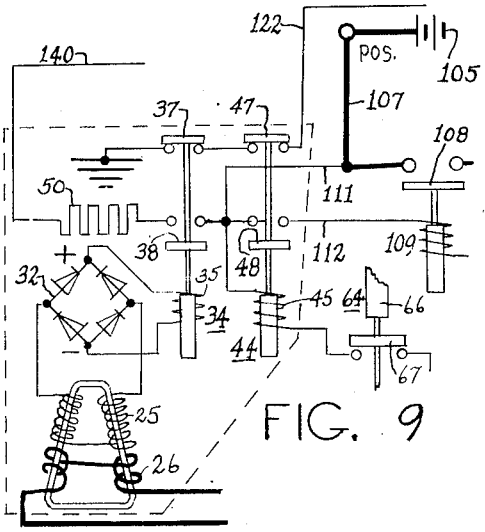
FIG. 9
WILLIAM E. McFARLAND
*INVENTOR.*
BY
*Peter J. Baylor*
*Attorney*

WILLIAM E. McFARLAND
*INVENTOR.*

Dec. 31, 1957  W. E. McFARLAND  2,818,512
DUAL LOAD RELAY AUTOMATIC STARTING SYSTEM FOR
ENGINE-GENERATOR PLANTS
Filed Feb. 1, 1956  3 Sheets-Sheet 3

WILLIAM E. McFARLAND
INVENTOR.

BY Peter J. Gaylor
Attorney

United States Patent Office 2,818,512
Patented Dec. 31, 1957

2,818,512

DUAL LOAD RELAY AUTOMATIC STARTING SYSTEM FOR ENGINE-GENERATOR PLANTS

William E. McFarland, Nutley, N. J.

Application February 1, 1956, Serial No. 562,866

13 Claims. (Cl. 290—30)

This invention falls in the field of automatic load-responsive controls for small A. C. engine-generator sets (electric plants) of the type employing a storage battery for cranking the engine. More particularly the invention relates to an improved load relay system used in such controls.

In copending application Serial Number 559,860, filed on January 18, 1956, by Willam E. McFarland, of which this application is a continuation-in-part, there is described a load relay system employing a current transformer and a rectifier for providing holding energization of an operating winding of the load relay system. The present invention utilizes a similar transformer and rectifier, but is limited to the advantageous condition of a load relay system which includes a separate battery-energized initially-responsive relay to effect the cranking of the engine.

The function of the load relay system is to provide switching operations which automatically start and stop the plant in accordance with load demand. A speed-responsive relay or system of relays is always included, in addition to the load relay system proper, and performs the necessary circuit switching operations so that battery current can flow through the load circuit when a new load is connected initially, in turn, enabling a primary response of the load relay system to effect engine cranking. When the engine has accelerated to at least a reasonable extent, the speed-responsive relay acts to reverse the switching operation, i. e., to disconnect the battery from the load circuit, and simultaneously to connect the A. C. generator with the load circuit. Thereafter, the load relay system must perform a switching operation, or, at least, hold a switching status such that the means for stopping the engine is held ineffective for the duration of the load. The load relay system must derive energy from load circuit current flow to enable it to hold the proper switching status. The load relay system then accomplishes a final switching operation to render the stopping means effective when all load is taken off the line.

The means for stopping the engine necessarily is one which is controllable by a switching action, and various means may be employed. For example, in diesel engines, it is customary to use an electrically energized valve in the fuel feed line, the load relay effecting switching to close the valve when all load is off the line thereby stopping the engine. In gasoline engines (which are more common) the ignition is nearly always effected by a magneto, and the simple expedient for stopping the engine is a ground circuit for the magneto, the load relay system including a normally closed contact in series with the ground circuit so that this contact closes as soon as all load is off the line, whereby the engine is stopped.

Load relay systems heretofore used have comprised a single relay, commonly called a load relay. This relay has a high resistance, fine wire operating winding, known as the shunt winding. It also has a large coarse wire operating winding always connected in series with the load circuit. Upon initial connection of load, the shunt winding of the relay becomes battery-energized to pull in the load relay armature for effecting the starting of the engine. Since the load relay is basically an A. C. relay, it is fast acting, and its armature would tend to rise during the switchover operation of the speed-responsive relay wherein generator energization is substituted for battery energization. This rising of the armature would be a disadvantage, because the load relays, heretofore employed, have not had dependable ability to pull down the armature on the basis of the coarse series winding energization alone. The difficulty can be avoided by special design and adjustment of the speed-responsive relay to assure a fast switchover of circuits whereby the load relay armature does not rise.

A small A. C. is fed continuously through the shunt coil to assist the naturally weak energization of the load relay under light load condition. The small A. C. through the shunt coil also assists in demagnetizing the relay core when all load is off the line. The conventional load relays, being adjusted to a high degree of sensitivity, with little or no air gap between the armature and main core, necessitate this demagnetizing expedient.

It has been customary, in conventional load relays used heretofore, to provide sufficiently sensitive design and adjustment so that the relay will hold a switching status with as little as 1% of rated load current flowing in the load circuit. This has necessitated large and expensive relays which are delicate and do not provide suitable operation, and particularly do not permit heavy pressure for the switching contacts. Attempts to provide the needed range of sensitivity have resulted in a significantly large voltage drop through the series winding of the relay.

A particular difficulty of the load relays used heretofore is with respect to the cranking operation. Upon initial connection of load, the load relay closes a normally open contact, which closes a battery circuit to the operating coil of the main cranking relay, to thus close the main cranking circuit. However, the load relays heretofore used have had no provision to interrupt immediately, after engine-starting, the circuit to the operating coil of the cranking relay, and an auxiliary switching arrangement, such as the inclusion of auxiliary contacts in the speed responsive relay, has been necessary for completing the cranking control function. Another difficulty of the load relays used heretofore has been that their contact pressure is weak, and it is not practical to add an additional normally-open set of contacts to the relay for the purpose of closing a battery charging circuit for such time as load is on the line. Therefore, it has been necessary to make other switching provision with respect to charging the battery from the operation of the generator. For example, it is customary to include a normally open set of contacts in the speed-responsive relay, and these contacts close the charging circuit as soon as the engine approaches load speed. However, if the engine is permitted to run after load is removed, but with an enforced slow idling speed in effect, the speed-responsive relay probably would hold its switching status at the lowered speed, and, unless additional design precautions were taken, the current in the battery charging circuit would flow in the wrong direction.

The difficulties with the load relays heretofore used are corrected by the present invention in which a specially adapted current transformer is used to provide a suitably powerful energization of one relay of the load relay system, which is a main or holding relay. This main or holding relay does not require an auxiliary operating winding, such as a shunt coil winding. In the present invention, a separate battery-energized initially-responsive small relay is provided as an additional element of the load relay system for taking over the function of getting the engine started, and to automatically open the cranking control circuit as soon as the engine has accelerated, and to relieve the holding relay of the system from all functions except the necessary function of holding the engine stopping means in ineffective condition. It can also be made to effect such other useful function as may be desired, such as control of the battery charging circuit and control of an idling device, if used. Both relays of the load relay system of the present invention are basically conventional small simple relays, and the system is functionally complete, eliminating the necessity for auxiliary switching control other than the necessary circuit switchover provided by the speed-responsive relay. Due to the rugged operation and complete functioning provided by the load relay system of the present invention, an idling electromagnet may be incorporated in the control system whereby the electric plant may be selectively used in any desired manner.

Figure 6:
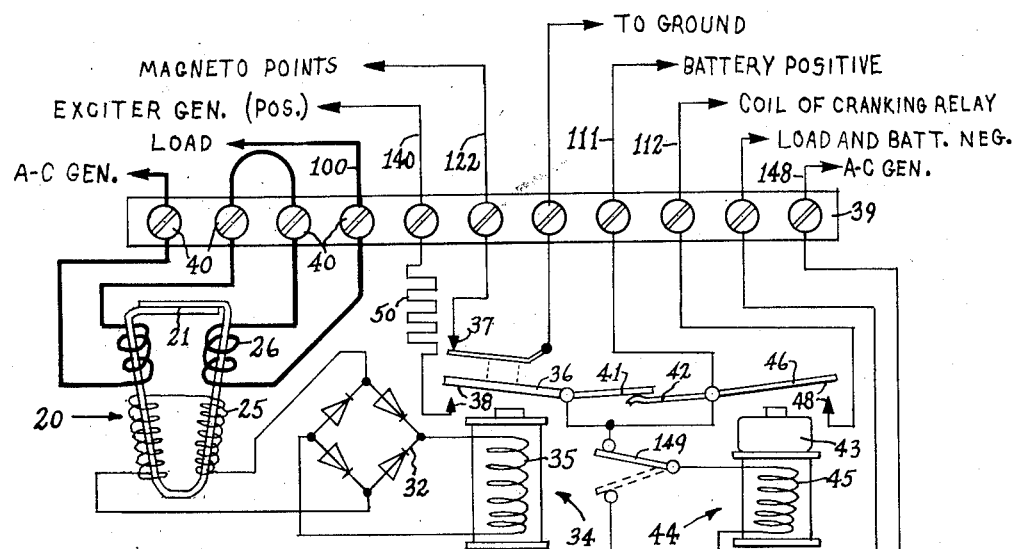
Figure 7:
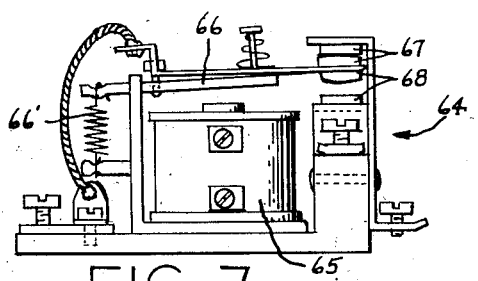
Figure 8:
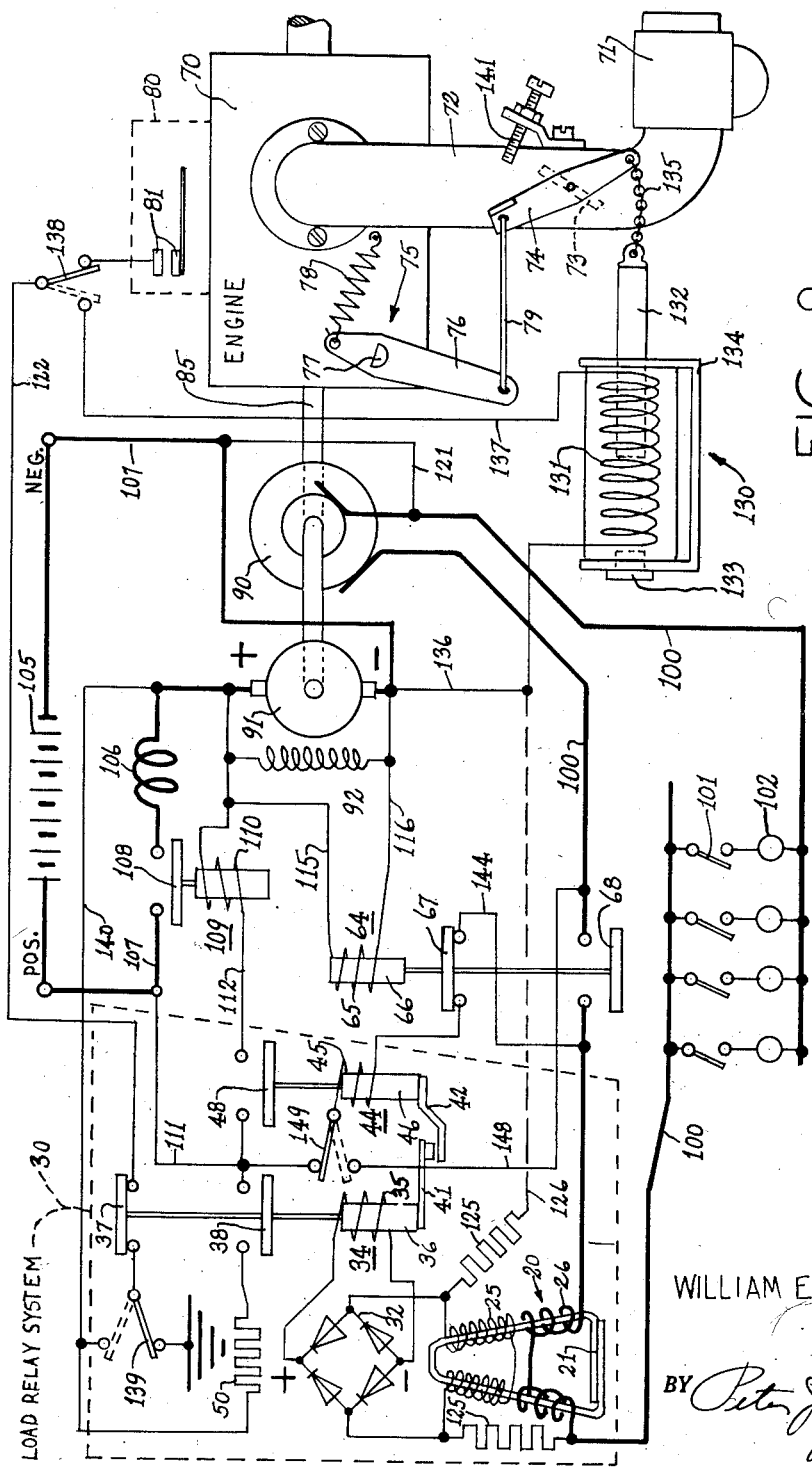

The invention will be more readily understood by reference to the accompanying drawings in which Figure 1 represents a plan view of a transformer suitable for the purpose heretofore outlined, while Figure 2 shows a cross-section of the core thereof. Figure 3 is a somewhat enlarged cross-sectional view lengthwise the core of a portion of said transformer. Figure 4 presents a view similar to that in Figure 1, of a modified form of suitable transformer. A side view of a load relay system of the present invention, devoid of necessary wiring is depicted in Figure 5, for which a circuit diagram is illustrated in Figure 6. Figure 7 shows a side view of a suitable type of relay for use as an additional element of the control system. Figure 8 is a schematic circuit diagram depicting a starting and stopping control system for an engine-generator plant embodying the load relay system of the present invention. Figures 9 and 10 illustrate similarly portions of a modified control circuit. Similar numerals refer to similar parts in the various figures.

The design of certain components of the load relay system will depend upon the size of the electric plant, its frequency, the degree of sensitivity required with respect to holding the plant running while feeding small line loads, and on still other factors. The two individual switching relays of the load relay system herein ordinarily may be inexpensive commercial relays, reasonably sensitive, yet rugged and suited for operation on pulsating, but unipolar, current. The rectifier may be an ordinary small selenium bridge-circuit rectifier.

The current transformer used herein is a most basic component of the load relay system, and should be so constructed and operated that it derives a significant energy from load circuit current flow even when flow is at such a small minimum as 1% or 2% of maximum flow, and it must provide an adequate and relatively constant, energy level output to the main relay of the system. A suitable current transformer is more fully described in copending application Serial No. 556,277, filed on December 29, 1955, by William E. McFarland.

It is a practical requirement of the transformer (which applies voltage to the rectifier) that the mass or weight of the core be kept extremely small, and that the core material be one having high permeability at points relatively high in the magnetization range of the material, such as at magnetic induction representing, say 25 to 50% of saturation. Both hysteresis and eddy current loss of the core should be small. A typically suitable commercial core material is that known as "Hipernic," which is a nickel-iron alloy containing 45–50% nickel. The following data are given for this material:

| Flux density, sq. in. | Ampere turns required per lineal inch for flux density | Core loss-watts per lb. | |
|---|---|---|---|
| | | 0.014″ lam. | 0.006″ lam. |
| 100,000 (Substantial Saturation) | 20 | 1.0 | 1.6 |
| 75,000 | 2 | .55 | .50 |
| 50,000 | .40 | .25 | .15 |
| 25,000 | .16 | .06 | .035 |

One procedure in arriving at a suitable design of a transformer of this design for use in a given electric plant, would be to first select the relay that is to be energized through the transformer action, and then adjust the relay to the required degree of rugged operation. Thereafter, it is necessary to determine the minimum A. C. power that must be applied to the rectifier in order to obtain operative energization of the relay. The objective then would be to design a transformer that requires the least drop in load circuit voltage, and yet provides the operative energization of the relay at suitably small minimum current flow through the primary winding and, in addition, will have relatively constant, energy output so as not to overheat the relay. In practice, however, an adequate procedure is to design a transformer (according to the directions outlined herein) which imposes only a reasonable drop in the load circuit voltage, which passes sufficient load current for several sizes of electric plants, and which does not overload the selected rectifier. As the final step, a relay is obtained which is suitable for the output, both with respect to having an energy requirement within the output ability of the transformer and with respect to having an operating coil of such high impedance as to obtain the high transformer efficiency under condition of the minimum current flow in the load circuit, such as a flow representing 1% of rated current flow.

Figure 1 illustrates a transformer 20 which is suitable for ordinary small electric plants of the usual 60 cycle frequency. In general, the design is based upon use of a suitable high permeability core of extremely small weight and having no appreciable air gap and particularly in which the core area is as small as possible, consistent with reasonable dimensions. Relatively undersized wire may be used for the primary winding to obtain a slender, low cost winding, having only a moderate heat loss due to the shortness of the turns. And, in this invention, the heat loss is not adverse with respect to the adequate minimum output of the transformer. Likewise, a bulky secondary winding is avoided by using greatly undersized wire, considering the high actual volt-ampere input of the transformer. The undersized secondary winding is not a disadvantage, since the transformer output will be held to a small value and since the high resistance secondary winding employed serves to protect the rectifier of the system.

Transformer 20 has a core 11 which may be assumed to be of "Hipernic" laminations. Four thick laminations are illustrated while, in practice, there should be a larger number of thin laminations. Overlapping of the strip lamination ends eliminates core air gap effect, the overlapping portions being held in tight relationship, as indicated by Figure 5. Figure 2 illustrates that the core should have a drastically restricted cross-sectional area, say, 0.063 square inch for the application illustrated. Transformer 20 has two individual coil or winding assemblies 22. Figure 3 illustrates a cross-sectional view of an assembly 22 as mounted on core 11. The windings may be wound on bobbins 24 of plastic or similar material, with secondary winding 25 preferably as the inner winding and primary winding 26, the outer.

An 0.063 square inch core area will carry approximately 6,300 flux lines at saturation. Thus, the maximum voltage drop through the shown 64 turns of primary winding will be approximately 1 volt. This is exclusive of the voltage drop of, say, 0.4 volt (on the basis of #12 wire) due to the D. C. resistance of the winding when rated current of 25 amperes is flowing through the winding. If, however, the two 32 turn sections of primary are arranged in parallel, 50 amperes may be passed through the transformer and the voltage drop will be cut in half.

Assuming that the impedance of the relay winding (which will be energized by the transformer) may be selected as needed, the secondary winding 25 would comprise as many turns as are consistent with avoidance of damage to the rectifier. The transformer will develop high instantaneous peak voltage. This will not produce excessive forward current through the rectifier, since the relay coil will present high impedance to limit the current flow. The peak voltage, however, tends to produce fairly significant reverse-direction current through the rectifier, and the heating from this cause tends to be a limiting factor on the number of secondary turns. It has been found that an ordinary selenium rectifier rated at 25 R. M. S. volts will safely permit use of 1600 turns of secondary winding for the specific transformer being described. The small wire used for the secondary winding suitably may have a resistance equal to 10% of that of the operating winding of the relay to be energized. The 1600 turn winding will result in an effective or average voltage of, say, 25 volts, on the basis of the secondary being open-circuited and the core operating at saturation, while in practice, the maximum effective secondary voltage will be less, due to some loss caused by the resistance of the secondary winding.

Transformer 20 is a current transformer having a very large number of turns of primary winding per lineal inch of core. This one benefit largely nullifies the effect of any possible core deficiencies, such as the air-gap effect in the core, or slight damage to the core material caused by bending the core laminations in assembling the transformer. Also, the transformer has an extremely large number of primary turns with respect to the very small weight of the core, which may be, say, ⅙ lb., in the transformer 20, as described. If, therefore, secondary winding 25 is assumed to be in open circuit condition, it will be apparent, by reference to the previously-given table of data for "Hipernic" material, that an extremely small current flow through primary winding 26 will result in magnetizing the core to, say, 25,000 lines flux density per square inch. While the data in the table are based on D. C. magnetization, starting with demagnetized material, they are reasonably accurate for estimating purposes under actual working conditions, since the hysteresis loop is very narrow in the case of "Hipernic" material. Thus, for example, when even 0.10 or 0.12 ampere is flowing through primary winding 26, there should be sufficient effective ampere turns to magnetize the core to 25,000 lines per square inch density, in spite of some slight core losses. If current flow through the primary winding then is increased to, say, 0.25 ampere, a small load may be connected to the secondary winding, such as one of high enough impedance to just prevent the core magnetization from rising above the suggested 25,000 lines per square inch flux density. Under this condition the transformer will be obtaining an input of 0.25 volt at 0.25 ampere, or, say, 0.06 volt-ampere and, in practice, at least half of the input may be converted to useful output. It is practical to obtain, from the described transformer, a useful output of, say, 0.03 or 0.04 volt-ampere, with current flow of 0.25 ampere through the primary winding. This is a significant amount of power with respect to holding energization of a switching relay which operates only small contacts. If the current flow through the primary winding then is increased, say, to 0.5 ampere, the core will be worked at a higher level, say, well toward 50,000 lines per square inch flux density. This level of magnetization is still within the high permeability range of "Hipernic" material, and the useful output of the transformer then will be near 0.15 volt-ampere, and this is significant power with respect to the requirement of actually pulling in a suitable type of relay. If the current is increased further, as to several amperes, the core will be operated at substantial saturation but without any marked distortion of the wave form. But, as the current through the primary is further increased, the wave form will become increasingly distorted with sharper voltage peakes, which, however, will have no other significant effect than causing some leakage current through the rectifier employed.

Figure 4 illustrates a transformer 20' which may be of similar proportions and core weight as that of the transformer 20. The core 21' is formed by threading long lamination stock through the bobbins 24 a number of times to build up the core. The performance of the transformers 20 and 20' will be similar.

Figure 5 illustrates a typically suitable arrangement of the elements of the load relay system as based on the circuit arrangement of Figure 3. Wiring is omitted in this figure. The load relay system as a whole is designated by numeral 30 and the elements are shown mounted upon a U-shaped base or bracket 31. Transformer 20 is horizontally supported by means of a clamp 33 which compresses the overlapping end portions of core 21. The two relays may be of similar kind. A suitable inexpensive type of relay is a commercial relay. This relay has an operating winding or coil about 1" high and is a reasonably sensitive type of relay while providing rugged contact operation for the purpose intended herein. The operating winding will withstand several watts energization.

Relay 34 is the transformer-energized relay (holding relay) of the system and includes an operating coil or winding 35. Wire size of winding 35 will be so selected that the transformer core is worked relatively high in the magnetization range upon very small load circuit current flow, such as, say, 0.25 ampere. A D. C. resistance of 300 ohms for winding 35 will provide an efficient condition with respect to sensitivity and will result in sufficiently high impedance with respect to the pulsating current energization so that winding 35 will never become overheated. Relay 34 has the usual armature 36, armature spring 36', normally-closed contacts 37 and normally-open contacts 38. Armature 36 has an outwardly extending narrow tail portion 41.

The rectifier for use with transformer 20 and relay 34 is indicated by numeral 32, and this may be a small bridge-circuit selenium rectifier. Typically suitable is a commercial rectifier, rated at 25 R. M. S. volts and 300 milliamperes. The 300 milliampere size, while still very small, is intentionally oversized with respect to the energization requirement of relay operating winding 35. The oversized arrangement provides added capacity to dissipate heat generated in the rectifier due to reverse current leakage. A strip 39 of plastic or similar material is provided with terminal screws 40.

Relay 44 is the initially-responsive, or battery-energized relay of the load relay system, for providing switching control with respect to the engine cranking circuit. The relay has an operating winding 45 which may have a resistance of 100 ohms, or even more (assuming use of the usual 12 volt starting battery), and the small relay will be strongly energized even though the battery current must pass through the load appliance as well as through the winding 45. This is because the initial (or cold) resistance of load appliances is rather low. Relay 44 has the usual armature 46, armature spring 46', a set of normally-open contacts 48, and a copper delay ring 43. Armature 46 has a narrow extending tail portion 42. As is well known, the copper delay ring 43 will slow down the action of the relay so that the relay can hold the contacts 48 closed momentarily after the energization of winding 45 has been interrupted.

The armature tail pieces 41 and 42 are so arranged that when the relay 44 is energized to pull down the armature 46, the tail piece 42 will bear upwardly against the tail piece 41 to thus move downwardly (at least part way) the other armature 36 and thus accomplish the opening of contacts 37, and the closing of contacts 38. Energization of relay 44 therefore will effect the initial pull-in motion of relay 34 and, due to the action of delay ring 43, will hold relay 34 pulled-in momentarily during a brief switchover period in which relay 34 is energized and relay 44 is de-energized.

Figure 6 illustrates the wiring diagram of unit 30, with typical external connections indicated. Four terminal screws 40 are allotted to primary winding 26, permitting series or parallel arrangement of the two sections of primary winding 26, according to the size of the individual electric plant. The particular circuit of Figure 6 is that to correspond with the full operating diagram shown in Figure 8. The primary winding 26 is in series with main load circuit 100. Secondary winding 25 feeds rectified but "unfiltered" current to winding 35 of the holding relay 34. The pulsating current will energize relay 35 efficiently. Smoothing out the pulsating current by means of a suitably large condenser across the output of rectifier 32 is impractical. Such expedient would result in a more steady D. C. applied to winding 35, but the voltage would be too high as the condenser would draw from the peak voltage developed in the present system.

Figure 7 illustrates a suitable type of relay for use as the speed-responsive relay system in the case of small electric plants. The relay, as a whole, is indicated by numeral 64, and has an operating winding 65, armature 66, armature spring 66', normally-closed contacts 67 and normally-open contacts 68. Relay 64 also may be termed the "power relay" of the control system, as it is the function of the relay, by closing contacts 68, to close the main load circuit (power circuit). Contacts 68 must close only after the engine has started and accelerated somewhat under its own power, and therefore, relay 64 properly also may be termed a speed-responsive relay. It is usual for the speed-responsive relay of the control system to be more elaborate, with auxiliary contacts besides the shown two principal sets of contacts, but in the system of the present invention, the speed-responsive relay may be quite simple, and is not even required to provide an especially fast switchover of circuits.

Figure 8 is a diagram showing elements of an automatic start-stop electric plant and illustrating a preferred circuit arrangement with respect to the load relay system of the present invention. Certain usual elements of a complete plant (which do not affect the design or basic operation of the load relay system), such as an automatic choke and thermally operated protective devices (to prevent prolonged cranking effort), have been omitted for simplicity. All the relays in Figures 8, 9 and 10 are indicated by a uniform type of symbol for clarity of illustration, but it will be understood that the relays in practice will be of appropriate type, as heretofore suggested and illustrated. For simplicity, each set of contacts now will be referred to as "contact."

In Figure 8, the load relay system 30 is laid out according to the wiring diagram of Figure 6, and the speed-responsive relay 64 has elements corresponding to the same relay shown in Figure 7. The two relays 34 and 44 may be of the type illustrated in Figure 5, and the tail portions 41 and 42 of the armatures 36 and 46, respectively, are indicated in schematic form in Figure 8.

The engine is indicated generally by numeral 70 and may be the common magneto-ignition type of engine. Engine 70 has a fuel intake system comprising carburetor 71, intake pipe 72 and throttle valve 73. Throttle arm 74 enables controlling movement of the throttle valve. A mechanical speed governor is indicated generally as 75, and it has an operating arm or lever 76 mounted on the usual governor rocker shaft 77. The governor's centrifugal mechanism (which may be within the engine) is not illustrated. A rigid link 79 connects governor arm 76 with throttle arm 74. The conventional governor loading spring 78 urges governor arm 76 in the direction to increase degree of throttle opening, which effect is opposed, as required, by the centrifugal mechanism which thus maintains engine speed for uniform frequency (usually 60 cycles). The ignition system is indicated generally by the broken-line enclosure 80, and has magneto breaker points 81. If points 81 are grounded, the ignition system is inoperable, and thus a ground circuit for the ignition system can be used as a stopping means for the engine. The stopping means likewise can be rendered ineffective by an open circuit condition of the ground circuit.

The generating components of the generator set are driven by the engine, as indicated schematically by shaft 85, and include a main or A. C. armature 90 which, in the present instance, may be assumed to have a 25 ampere rating, the D. C. or exciter armature 91, and a shunt field 92. One shunt field only is shown since in small plants it is common practice to use a single shunt field for both A. C. and D. C. generation.

Load generator 90 serves to provide power for the load circuit 100. Connectable in the load circuit by switches 101 are the various load appliances 102 which may range in size from 1% or 2% of capacity to much larger. A load 102 can be served only if the relay contact 68 is closed.

Starting battery 105 is usually a 12 or 24 volt storage battery. A special cranking field 106 is energized by battery current flow through the solid line cranking circuit 107 at such times as the contact 108 of the main cranking relay 109 is closed. Field 106 co-operates with D. C. armature 91 to provide a powerful motor for cranking the engine. Cranking relay 109 includes an operating winding 110. Winding 110 is battery-energized, the circuit from battery 105 positive being through wire 111, contact 48 when closed, wire 112, winding 110, armature 91, and to battery negative.

The preferred energization of winding 65 of the speed-responsive relay is as shown, being a shunt connection with exciter armature 91 through wires 115 and 116. Wire size of operating coil 65 should be such that relay 65 will pull in (to reverse the shown contact positions) only when engine speed has come up sufficiently so that exciter armature 91 is generating a voltage that is higher than battery voltage, and preferably only when engine speed is reasonably close to full running speed. Relay 64 will drop out again only when the engine has decelerated considerably, or has stopped.

The circuit for energization of initially-responsive (engine-starting) relay 44 is, from battery positive, wire 111, manual switch 149 when closed, relay winding 45, contact 67 when closed, wire 144, transformer primary 26, any closed switch 101 and load 102, and through wire 121 and circuit 107 to battery negative. The magneto ground circuit is through manual switch 138 when closed, wire 122, contact 37 of the holding relay 34, and manual switch 139 when closed.

As one feature, Figure 8 illustrates a complete automatic idling control system. This system includes the idling electromagnet 130 which has an operating winding 131, plunger 132, fixed core or stop 133, and a main frame 134. A chain 135 connects plunger 132 with throttle arm 74. Winding 131 is energized from exciter armature 91. The circuit from the positive side is through wire 140, switch 139 when in broken-line position, load relay contact 37 when closed, wire 122, switch 138 when in broken line position, wire 137, winding 131 and wire 136 to generator negative. Plunger 132 will exert a pull on chain 135 to oppose the action of governor 75 and thus reduce engine speed for such periods as winding 131 is energized.

A small auxiliary energization may be provided with respect to holding relay 34 of the load relay system. This is optional, as the present load relay system is very sensitive without auxiliary energization. In the case of larger electric plants, the transformer primary winding 26 may not comprise very many turns, and the auxiliary energization will aid in obtaining sensitive holding response on the part of relay 34. The auxiliary energization circuit, starting from the left terminal of A. C. generator 90, is through relay contact 68 when closed, transformer primary 26, one high resistance resistor 125, to then connect with both rectifier 32 and with secondary winding 25. The current may therefore split, part of it passing through the rectifier 32 and the relay operating coil 35, and part of it passing through the transformer secondary 25. The current unites at an opposite junction, passes through the second high resistance resistor 125, and then through wires 126 and 136 to generator negative, the wire 126 being a broken line to indicate that the circuit may be omitted. Resistors 125 will be of large value to limit the current to a few milliamperes, two resistors 125 being preferred rather than one to better isolate rectifier 32 against possibility of accidental short-circuit.

With manual switches 138, 139 and 149 in the solid line positions, the plant will be operated as a conventional automatic start-stop plant in response to load demand. Positions of Figure 8 are those of a stopped plant at which time throttle 73 is open. Closing of any switch 101 will complete the above-described circuit for the battery-energization of initially-responsive load relay 44 resulting in movement of armature 46 to close the relay contact 48. Referring especially to Figure 5 it will be apparent that when armature 46 is moved to the energized position, armature 36 also will be moved to or toward energized position, and at least sufficiently so to open relay contact 37. The now-closed contact 48 assures energization of the cranking circuit relay 109 to close cranking circuit contact 108 to start cranking the engine, while open contact 37 simultaneously renders the engine stopping means (magneto ground circuit) ineffective so that the engine can be started. As the engine fires and picks up speed, exciter armature 91 begins to generate D. C. and, at a certain point, cranking contact 108 will open since relay coil 110 is momentarily between two equal and opposing voltages. As the engine accelerates further under its own power, the voltage generated by armature 91 rises toward normal load speed voltage and above the battery voltage and will sufficiently energize relay winding 65 to effect reversal of the shown positions of contacts 67 and 68. This action terminates the energization of relay 44 (and assures immediate opening of contact 48) and, practically simultaneously, the main running circuit is established, through contact 68. Since relay 44 (as indicated in Figure 5) may be slow acting, contact 37 is held open momentarily during the switchover operation of relay 64 and, even if the relay 34 were permitted to drop out during the switchover operation, this relay would quickly pull-in to again immediately open contact 37, as even a very small initial current flow in the load circuit will result in sufficient energization of relay winding 35 to assure a new pull-in of the relay. Relay contact 37 thereafter will remain open as long as a slight flow of current exists in the load circuit. During this same period, relay contact 38 is held closed. This provides a recharging circuit for battery 105, and it is a circuit which is closed only when load is connected on the line, and thus, for all practical purposes, the circuit is closed only when the engine is operating at full normal speed. The circuit, from generator positive, is through wire 140, a suitable resistor 50, contact 38, wire 111, battery 105, and circuit 107, to generator negative.

When all load switches 101 are opened, relay contact 37 will close, thus providing the necessary switching operation to render the engine stopping means effective. It will be obvious that the auxiliary energization of relay coil 35, as provided through resistors 125, will be sufficiently slight so that relay 34 can drop out when all load has been disconnected.

The manual switches 138 and 139 may be placed in the broken-line positions to provide a control circuit for idling electromagnet 130, and at the same time prevent closing of the magneto ground circuit. Again, assuming the engine stopped, when a load switch 101 is next closed, the engine will be started and the load will be served, as previously described, and, when all load is disconnected, contact 37 will close, as described. This, however, will close the described circuit for energization of winding 131, and plunger 132 will be strongly pulled inwardly, taking up all slack in chain 135 and closing throttle 73, to the extent of the fixed limit which may be provided by adjustment of stop screw 141. The engine will be sloweddown, but armature 91 will continue to generate some voltage and thus plunger 132 will be held inwardly, opposing the effort of governor 75 to restore full speed operation.

Depending upon design conditions, the idling speed may be quite slow or only relatively slow. If idling speed is only relatively slow relay winding 65 will remain sufficiently energized so that contact 68 is held closed during the slow idling period. Under this assumption, when a load switch is again closed, load circuit current (of low initial frequency) will flow through primary winding 26, quickly effecting the opening of contact 37 which, in turn, renders idling electromagnet 130 ineffective. Contact 38 simultaneously will be closed so that battery charging will occur during the interval of full speed operation.

If, however, the idling speed is to be quite slow, relay 64 will drop out each time the engine decelerates to idling speed, thus opening contact 68 but closing contact 67. Assuming this, when a load switch 101 is closed next, relay 44 will be momentarily battery-energized. As in the case of the described start-stop operation, relay contact 48 momentarily will be closed, and contact 37 will be opened, which will assure the needed acceleration of the engine, and will, in turn, accomplish the needed energization of relay 65 to close the main load circuit contact 68 upon which action the load will be served. This latter-described form of automatic idling control in which the battery-energized relay is initially responsive, is advantageous. This sequence results in full sensitivity and, in addition, the load circuit is not closed until the engine has reached high speed, enabling quick starting ability with respect to heavy loads.

It is frequently desired to disconnect the starting battery from small electric plants to enable portability. In such event, switch 149 may be moved to the broken line position. The engine is manually cranked and will operate at slow idling speed until a load switch 101 is closed. It may be assumed that the idling speed is fully slow and that contact 68 will be opened each time the plant decelerates to idling speed. Each time a new load demand occurs (by closing a switch 101) there will be an A. C. energization of relay winding 45 rather than the battery energization heretofore described. The circuit is from left side of A. C. generator 90, through wire 148, switch 149, relay winding 45, relay contact 67, wire 144, and then following the load circuit to the right side of the A. C. generator. This A. C. energization will pull in relay 44, even though in a chattering manner which will effect the opening of contact 37 to de-energize idling electromagnet winding 131 and, in turn, the engine will speed up and the normal running circuit will be established. The impedance value of winding 45 will be fairly high with respect to A. C. energization, so that it will not be overheated by the brief energization. It will be apparent that, with the starting battery 105 disconnected, the arrangement of Figure 8 still provides a highly sensitive and efficient automatic idling system of control.

The following features of the invention are now apparent: The load relay system comprises an initially-responsive battery-energized relay which effects closing of the cranking circuit for only the brief necessary period, and which holds the engine stopping means ineffective until the holding relay of the system takes control, and particularly accomplishes this by an over-riding relationship of the relay armatures which affords the initial pull-in operation of the holding relay. The holding relay of the system is efficiently energized by transformer action. The battery charging circuit is controlled by the holding relay so that the circuit is closed only at the proper time. The engine can be idled by any desired means without conflicting with the control system, and particularly, the load relay system relays can be utilized to provide control of automatic idling of the engine when all load is disconnected. The load relay functions are complete without use of auxiliary relays or auxiliary contacts incorporated in the speed responsive relay. A simple and efficient auxiliary energization circuit is provided to enable the holding relay of the system to hold the load speed status of the plant on the basis of extremely small line loads.

Figures 9 and 10 illustrate circuit modifications with respect to the bi-relay load relay system. For simplicity, the automatic idling system has been omitted in these figures, as well as the auxiliary energization circuit for relay 34. The extending tail portions 41 and 42 of the load relay armatures 36 and 46 are also omitted and are not needed in these figures. Figures 9 and 10 are partial diagrams and the elements which are omitted, such as the generators, may be assumed to be identical as those described with respect to Figure 8.

In Figure 9, the initially-responsive relay 44 is shown to have a normally-closed contact 47 which is connected in series with similar contact 37 of holding relay 34. Thus, the opening of either of the contacts will render the engine stopping means ineffective. The operation of the Figure 9 arrangement is similar to that described for Figure 8. Closing of a load switch 101 (see Figure 8) will accomplish the battery energization of winding 45 and thus effect starting of the engine while the magneto ground circuit is simultaneously held open. Upon acceleration, the switchover operation of speed-responsive relay 64 will occur, effecting de-energization of winding 45, but the energization of winding 35 will follow so that relay contact 37 will open immediately to insure the continued operation of the engine. Contact 37 necessarily will become closed to stop the engine when all load has been disconnected from the load circuit.

In Fig. 10 the initially-responsive relay 44 is shown to have two normally-open contacts 48 and 49. Contact 49 provides for a temporary (battery) energization of holding relay 34. This circuit is from battery positive, contact 49, wire 113, the positive terminal of relay winding 35, through the winding, and through a wire 126 to the negative side of the battery. The polarity arrangement is such that no current will flow through rectifier 32. Closing of a load switch 101 will accomplish the battery energization of winding 45 to effect cranking of the engine. Simultaneously relay contact 49 will be closed, in turn energizing relay winding 35 to assure immediate opening of contact 37 to open the magneto ground circuit. The engine will start and accelerate, to result in the opening of relay contact 67 and closing of 68. Then relay 44 will drop out and be of no further effect, but the flow of current in the load circuit insures the continued energization of holding relay 34 so that contact 37 will remain open until all load has been disconnected.

I claim:

1. In an automatic start-stop control system for an internal combustion engine-driven generator set including an A. C. generator serving at least one connectable-disconnectable load in a load circuit, a speed governor for regulating the engine fuel under load condition, cranking means including a battery for starting the engine, stopping means for stopping the engine by switching operation of the hereinafter-mentioned load relay system, said control system also including a speed-responsive relay system for providing the hereinafter-mentioned circuit switching after starting of the engine, the improvement comprising said speed-responsive relay system having normally-open contacts and normally-closed contacts, and comprising said load relay system constructed and arranged to start and stop the engine in response to initiation and termination of load connection, respectively, said load relay system including a battery-energized switching relay having a battery-energized operating winding and responsive, upon energization of said winding, to effect switching action to control said cranking means so as to start the engine while rendering said stopping means ineffective, said load relay system also including a rectifier, a current transformer, and a transformer-energized switching relay having a transformer-energized operating winding and responsive upon transformer energization of said last winding to act upon said stopping means and hold it ineffective, thereby enabling continuous operation of the engine, and responsive, upon termination of energization of said last winding, to effect the switching operation to stop the engine, said battery-energized operating winding being connected in series with the battery and the load circuit and with the normally-closed contacts of the speed-responsive relay system in a manner so that when a load is connected initially in the load circuit, said winding becomes battery-energized to effect starting of the engine, said speed-responsive relay system being constructed and arranged to open said normally-closed contacts when the engine has accelerated toward governed speed, and, at the same time to close said normally-open contacts, thereby connecting the A. C. generator with the load circuit, said transformer having its primary winding connected in series with the load circuit and having its secondary winding arranged to feed current through said rectifier into said transformer-energized winding until termination of load circuit current flow, said transformer being constructed and arranged to operate at high saturation, and to provide an adequate and relatively constant energy level output to said transformer-energized operating winding under variable load conditions.

2. An automatic start-stop control system according to claim 1 in which the two relays of said load relay system include a switching contact operable in one position to make effective said engine stopping means and operable in another position to make ineffective said engine stopping means, said two relays being constructed and arranged whereby, upon energization of either said battery-energized winding or said transformer-energized winding, said switching contact is held in said another position to make ineffective said engine stopping means, and whereby, upon de-energization of both said latter windings, said switching contact is held in said one position to make effective said engine stopping means.

3. An automatic start-stop control system according to claim 2, in which said switching contact is disposed in said transformer-energized relay, and in which system there is incorporated a mechanical connection with said battery-energized relay, arranged, when said battery relay is energized, to act upon said transformer-energized relay in a manner to place said switching contact in said another position to make ineffective said engine stopping means.

4. An automatic start-stop control system according to claim 3, in which the two said relays of the load relay system are conventional small switching relays having movable armatures which effect their switching operations by movement of their armatures, and in which the mechanical connection is an over-riding lever arm arranged so that when the armature of the battery-energized relay is moved to the energized position, the armature of the transformer-energized relay is carried toward the energized position to effect the said another position of said switching contact.

5. An automatic start-stop control system according to claim 1 in which the transformer has a core of small cross-sectional area and is made of material having high permeability extending at least relatively high in its magnetization range, and in which the rectifier is a bridge-circuit rectifier, and in which the transformer-energized operating winding has a high impedance with respect to the transformer, whereby the core is operated at least relatively high in the magnetization range even when small A. C. flows in the load circuit, whereupon the transformer is enabled to obtain a significant voltage input, and said core is operated at saturation when large A. C. flows in the load circuit, whereby over-energization of said last operating winding is prevented.

6. An automatic start-stop control system according to claim 5 in which the transformer core is made of laminations of high permeability material.

7. An automatic start-stop control system according to claim 1 which also includes an idling electromagnet energizable through switching action of the load relay system and constructed and arranged to act upon the engine governor at a status of energization or de-energization of said electromagnet to effect a lowered engine speed, for idling, and manually operable selective switching control whereby, at one position of said switching control, the means for stopping the engine is made ineffective, and the said latter status of energization or de-energization of said electromagnet is effected upon cessation of energization of said transformer-energized operating winding, whereby lowered idling speed is effected when the load circuit is opened.

8. An automatic start-stop control system according to claim 7 in which said generator set includes an exciter generator which generates a voltage during load speed operation that is higher than the voltage of the starting battery, a battery-charging circuit enabling charging of the starting battery when load speed operation is in effect, said transformer-energized relay including normally-open contacts in series with said charging circuit, and acting to close said charging circuit only when said transformer winding is energized whereby said charging circuit is closed only when load-speed operation is effective.

9. In an automatic start-stop control system for a magneto-ignition internal combustion engine-driven generator set including an exciter generator and an A. C. generator serving at least one connectable-disconnectable load in a load circuit, a governor for regulating the engine fuel under load condition, cranking means including a battery for starting the engine, said means including a main cranking relay to close the cranking circuit, said cranking relay including an operating winding energizable by battery current to effect closing of the main cranking contacts, a ground wire circuit serving as engine stopping means and arranged for rendering the magneto ineffective when said ground wire circuit is closed to thereby stop the engine, a power relay serving as the speed-responsive relay and responsive to rise in exciter generator voltage after starting the engine, for providing the hereinafter-mentioned circuit switching, the improvement comprising normally-open and normally-closed contacts in said power relay, and comprising a load relay system including an initially-responsive relay having normally-open contacts, said relay being energizable by battery current to close said normally-open contacts to thereby close the battery circuit to said operating winding of said main cranking relay and thus crank the engine, said initially-responsive relay including circuit-opening means to effect holding open said ground wire circuit while said cranking relay is energized, said load relay system also comprising a holding relay having an operating winding and normally-closed contacts in series with said ground wire circuit and arranged to continue holding open said ground wire circuit while said holding relay is energized, and to close said ground wire circuit when said relay is de-energized, said initially-responsive relay having an operating winding connected in series with the battery and the load circuit and with the normally-closed contacts of said power relay in a manner so that when a load is connected initially in the load circuit, said last winding becomes battery-energized to effect starting of the engine, said power relay being responsive on rise in voltage to open said normally-closed contacts and, at the same time, close its normally-open contacts, thereby connecting the A. C. generator with the load circuit, a current transformer and a rectifier for energizing said operating winding of said holding relay until termination of load circuit current flow, said current transformer having its primary winding in series with the load circuit and having its secondary winding arranged to feed current through said rectifier to said latter winding, said transformer being constructed and arranged to operate at high saturation, and provide an adequate and relatively constant energy level output to said transformer-energized operating winding under variable load conditions.

10. An automatic start-stop control system according to claim 9 in which the means to effect holding open said ground wire circuit while said initially-responsive relay is energized, is a mechanical connecting means arranged to enable said initially-responsive relay, when energized, to open the normally-closed contacts of said holding relay.

11. An automatic start-stop control system according to claim 10 in which both said initially-responsive relay and said holding relay are conventional small relays having armatures and switching contacts actuated by armature motion, and in which said mechanical connecting means comprises lever means whereby the armature of said initially-responsive relay is arranged in over-riding relationship to the armature of said holding relay thereby accomplishing switching operation of both relays upon energization of said initially-responsive relay.

12. In an automatic start-stop control system for an internal combustion engine-driven generator set including an A. C. generator serving at least one connectable-disconnectable load in a load circuit, a speed governor for regulating the engine fuel under load condition, cranking means including a battery for starting the engine, said last means including a main cranking relay to close the cranking circuit, said cranking relay including an operating winding energizable by battery current to effect closing of the main cranking contacts, stopping means for stopping the engine by switching operation of the hereinafter-mentioned transformer-energized relay, said control system also including a speed-responsive relay for providing the hereinafter-mentioned circuit switching after starting of the engine, the improvement comprising normally-open and normally-closed contacts in said speed-responsive relay, and comprising a load relay system including a battery-energized initially-responsive switching relay having a battery-energized operating winding and responsive upon energization of said winding to close a normally-open contact to thereby close the battery circuit to said operating winding of said cranking relay for cranking the engine, and to close a normally-open contact to effect a battery-circuit temporary energization of the hereinatfer-mentioned transformer-energized switching relay, said load relay system also including a rectifier, a current transformer, and a transformer-energized switching relay, said last relay being responsive, upon energization, to act upon said stopping means to hold it ineffective, thereby enabling continuous operation of the engine, and responsive, upon de-energization, to effect the switching operation to stop the engine, said battery-energized operating winding being connected in series with the battery and the load circuit and with the normally-closed contacts of the speed-responsive relay in a manner so that when a load is connected initially in the load circuit, said winding becomes battery-energized to effect starting of the engine and at the same time effect said battery-circuit temporary energization of said transformer-energized relay, whereby said stopping means immediately is held ineffective, said speed-responsive relay being constructed and arranged to open its normally-closed contacts when the engine has accelerated toward governed speed, and to simultaneously close its normally-open contacts to connect the A. C. generator with the load circuit, said transformer having its primary winding connected in series with the load circuit and having its secondary winding arranged to feed current through said rectifier into said transformer-energized relay until termination of load circuit current flow, said transformer being constructed and arranged to operate at high saturation, and to provide an adequate and relatively constant energy level output to said transformer-energized relay under variable load conditions.

13. An automatic start-stop control system according to claim 12 in which said transformer-energized relay has one operating winding, said latter winding being connected through said rectifier to said transformer for transformer-energization of said winding, said latter winding also being connectable with the battery, and being temporarily battery-circuit-energized while the normally-open contacts of said initially-responsive relay are closed.

References Cited in the file of this patent

UNITED STATES PATENTS

| | | |
|---|---|---|
| 1,704,996 | Witzel | Mar. 12, 1929 |
| 1,866,494 | Strong | July 5, 1932 |
| 2,611,877 | Walters | Sept. 23, 1952 |
| 2,762,933 | Foxcroft | Sept. 11, 1956 |